United States Patent
Matsushita et al.

(10) Patent No.: US 12,109,924 B2
(45) Date of Patent: Oct. 8, 2024

(54) OCCUPANT RESTRAINT DEVICE

(71) Applicant: Autoliv Development AB, Vargarda (SE)

(72) Inventors: Tetsuya Matsushita, Kanagawa (JP); Abhiroop Vishwanatha, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/756,732

(22) PCT Filed: Oct. 20, 2020

(86) PCT No.: PCT/JP2020/039402
§ 371 (c)(1),
(2) Date: Jun. 1, 2022

(87) PCT Pub. No.: WO2021/111748
PCT Pub. Date: Jun. 10, 2021

(65) Prior Publication Data
US 2023/0012314 A1    Jan. 12, 2023

(30) Foreign Application Priority Data
Dec. 6, 2019   (JP) .................. 2019-221471

(51) Int. Cl.
*B60R 21/207*   (2006.01)
*B60N 2/427*   (2006.01)
(Continued)

(52) U.S. Cl.
CPC ........ *B60N 2/42763* (2013.01); *B60R 21/207* (2013.01); *B60R 21/237* (2013.01);
(Continued)

(58) Field of Classification Search
CPC ..... B60R 21/207; B60R 21/237; B60R 21/06; B60R 21/08; B60R 21/2338;
(Continued)

(56) References Cited

U.S. PATENT DOCUMENTS

2019/0248323 A1* 8/2019 Saito ................. B60R 21/23138

FOREIGN PATENT DOCUMENTS

| GB | 2519449 A | 4/2015 |
|---|---|---|
| JP | 2002-211354 A | 7/2002 |

(Continued)

OTHER PUBLICATIONS

Office Action received in corresponding Chinese Patent Application 202080078011.5, dated Apr. 10, 2023 with translation.
(Continued)

*Primary Examiner* — Keith J Frisby
(74) *Attorney, Agent, or Firm* — Harness, Dickey & Pierce, P.L.C.; Stephen T. Olson

(57) ABSTRACT

An occupant restraining device that uses a side airbag to promote occupant restraint. An occupant restraining device for restraining an occupant seated in a vehicle seat having a seatback and seat cushion, including: a side airbag arranged on at least one of the right side or the left side of the seat back, a tension member arranged over the side portion of the seat back and the seat cushion and a portion thereof provided on the outer surface of the side airbag, and a traction portion on which another portion of the tension member is provided, that is stowed on the inside of or below the seat cushion, and that can pull the tension member, wherein the tension member arranged on the side of the seatback is pulled toward the center of the vehicle seat by the traction portion.

16 Claims, 16 Drawing Sheets

(51) Int. Cl.
*B60R 21/2338* (2011.01)
*B60R 21/237* (2006.01)
*B60R 21/231* (2011.01)

(52) U.S. Cl.
CPC .............. *B60R 2021/23107* (2013.01); *B60R 2021/23146* (2013.01); *B60R 2021/23386* (2013.01); *B60R 2021/23388* (2013.01)

(58) Field of Classification Search
CPC .............. B60R 21/23138; B60R 21/18; B60R 2021/23388; B60R 2021/23386; B60R 2021/23146; B60R 2021/23107; B60N 2/42763; B60N 2/42754; B60N 2/42727; B60N 2/427; B60N 2/914; B60N 2/90
USPC .............. 280/730.1, 730.2, 733, 743.2
See application file for complete search history.

(56) References Cited

FOREIGN PATENT DOCUMENTS

| JP | 2008-201297 A | | 9/2008 |
|---|---|---|---|
| JP | 2011-240746 A | | 12/2011 |
| JP | 2013-159220 A | | 8/2013 |
| JP | 2014012475 A | * | 1/2014 |
| JP | 2019-137319 A | | 8/2019 |
| WO | 2013/108473 A1 | | 7/2013 |
| WO | 2019107398 A1 | | 6/2019 |

OTHER PUBLICATIONS

Office Action regarding Chinese Application No. 2020800780115, dated Aug. 7, 2023.

* cited by examiner

OCCUPANT RESTRAINT DEVICE

TECHNICAL FIELD

The present technology relates to an occupant restraining device that restrains an occupant of a vehicle in the event of a collision.

CONVENTIONAL TECHNOLOGY

Conventionally, an occupant restraining device including side airbags provided on the left and right sides of the seatback and a tension cloth (band) attached to the outer surface of the side airbags has been proposed (see, for example, Patent Document 1).

When the side airbag expands and deploys, the band is pushed from the side airbag and tension is generated in the band. The tension presses the side airbag against a sitting occupant, restraining and protecting the occupant.

PRIOR ART DOCUMENTS

Patent Document

[Patent Document 1] Japanese Unexamined Patent Application 2019-137319

SUMMARY OF THE INVENTION

Problem to be Solved by the Invention

In recent years, there has been further demand for side airbags to reliably restrain occupants.

In light of these circumstances, an object of the present disclosure is to provide an occupant restraining device that enables promoting occupant restraint using side airbags.

Means for Solving the Problem

An occupant restraining device according to an Embodiment of the present disclosure for restraining an occupant seated in a vehicle seat having a seatback and seat cushion, including:
- a side airbag arranged on at least one of the right side and the left side of the seat back;
- a tension member arranged over the side portion of the seat back and the seat cushion and a portion thereof provided on the outer surface of the side airbag; and
- a traction portion on which another portion of the tension member is provided, that is stowed on the inside of or below the seat cushion, and that can pull the tension member, wherein
- the tension member arranged on the side of the seatback is pulled toward the center of the vehicle seat by the traction portion.

The occupant restraining device according to an Embodiment of the present disclosure, wherein the traction portion has a rotating body, and rotation of the rotating body pulls the tension member toward the center of the vehicle seat.

The occupant restraining device according to an Embodiment of the present disclosure, wherein the traction portion has a retractor, and winding of the retractor pulls the tension member toward the center of the vehicle seat.

The occupant restraining device according to an Embodiment of the present disclosure is provided so that the tension member passes through the upper surface of the in-seat airbag.

The occupant restraining device according to an Embodiment of the present disclosure, wherein the in-seat airbag is secured to the seat cushion, the tension member has a through hole for inserting, and a support portion that movably supports the tension member is provided on the outside of the in-seat airbag.

The occupant restraining device according to an Embodiment of the present disclosure, wherein the tension member is arranged so as to pass in front of the in-seat airbag when the in-seat airbag expands and deploys.

The occupant restraining device according to an Embodiment of the present disclosure, wherein the in-seat airbag is folded so as to overlap vertically and the portion of the in-seat airbag that the tension member is arranged on is sandwiched by the in-seat airbag in the vertical direction and is attached in the front-to-back length-wise direction of the in-seat airbag in the front-to-back direction in plan view.

The occupant restraining device according to an Embodiment of the present disclosure, wherein
the in-seat airbag further includes:
  a rolled member that is rolled in the front-to-back direction of the in-seat airbag, the rolled member includes:
    a folded member folded in a bellows shape on the upper surface or lower surface on the rear portion of the in-seat airbag enabling extending the length of the rolled up perimeter of the rolled member during expansion and deployment of the seat cushion, and
  the tension member is connected to the folded portion.

The occupant restraining device according to an Embodiment of the present disclosure, wherein the rolled member is configured so that the connecting portion with the folded portion of the tension member is arranged at the front end portion of the in-seat airbag when the in-seat airbag expands and deploys.

The occupant restraining device according to an Embodiment of the present disclosure, wherein the folded portion is folded at least once and is connected to the tension member at the uppermost portion of the rolled member folded portion.

The occupant restraining device according to an Embodiment of the present disclosure, wherein the in-seat airbag is secured to a frame body of the vehicle seat and both front and back end portions of the rolled member are secured to the in-seat airbag or frame body via both front and back end portions of the in-seat airbag.

Effect of the Invention

In the occupant restraint device according to an embodiment of the present disclosure, a tension member is provided in the in-seat airbag stowed inside of or below the seat cushion and the tension member is caused to move by expansion and deployment of the airbag. Thereby, the tension member arranged on the side of the seat back is pulled toward the center and the front of the seat, the side airbag is arranged in front of the occupant, and the side airbag is pressed toward the occupant side by the tension member and can promote restraint of occupants.

EMBODIMENTS OF THE INVENTION

Embodiment 1

Figure 1:
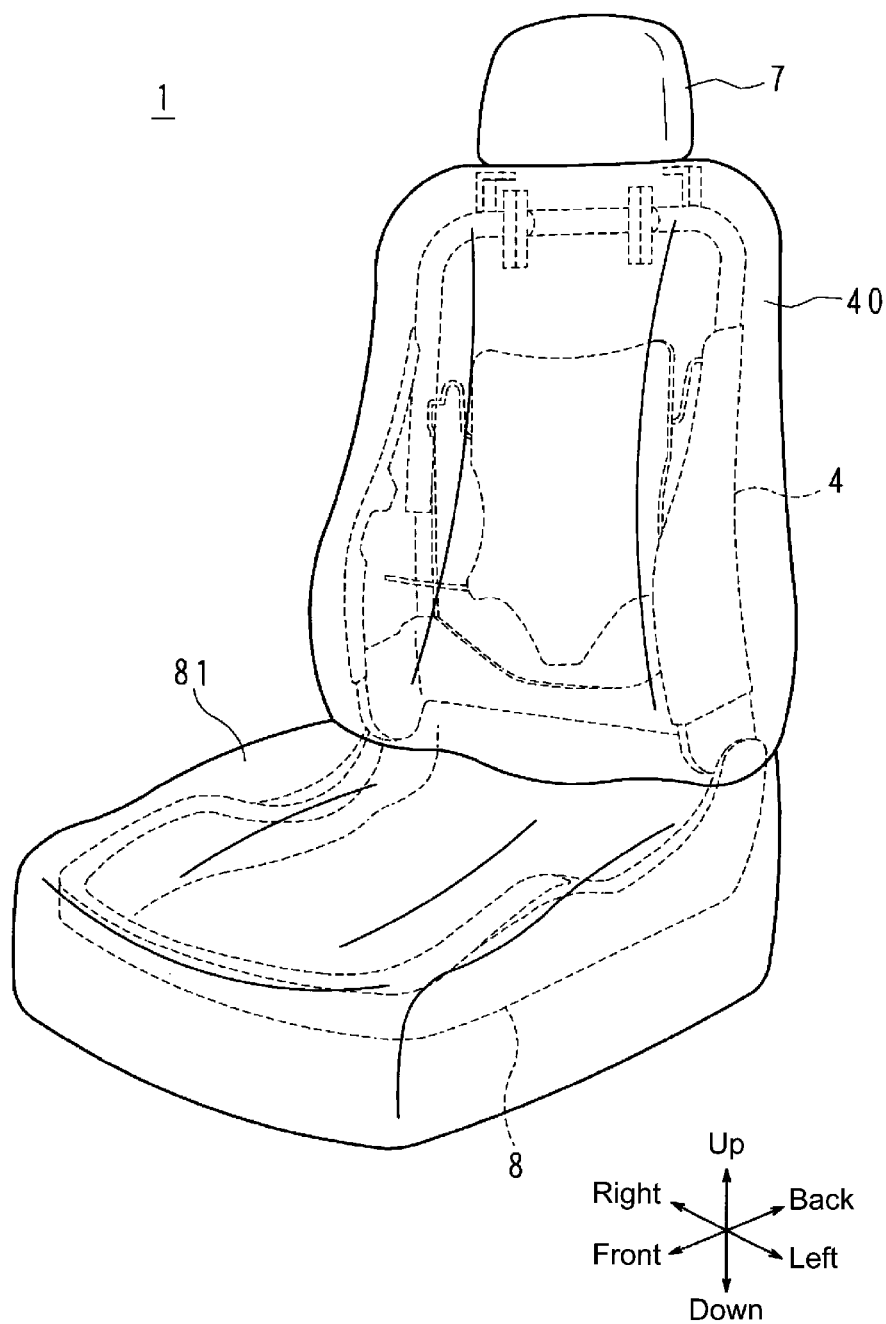
FIG. 1 is an external perspective view of a seat according to Embodiment 1.
Figure 2A:
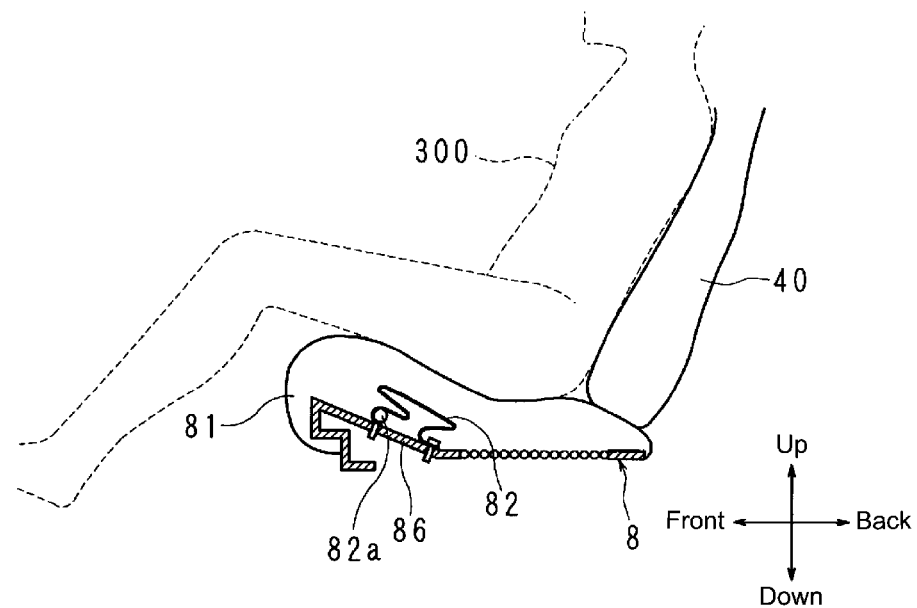
FIG. 2A is a schematic left side partial cross-sectional view of the seat in which an in-seat airbag is folded.
Figure 2B:
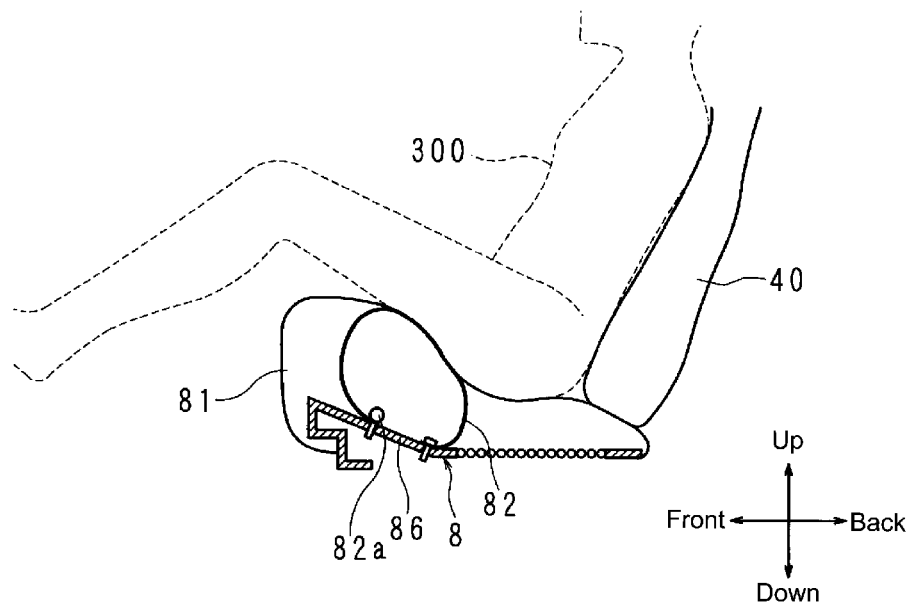
FIG. 2B is a schematic left side partial cross-sectional view of the in-seat airbag deployed.
Figure 3:
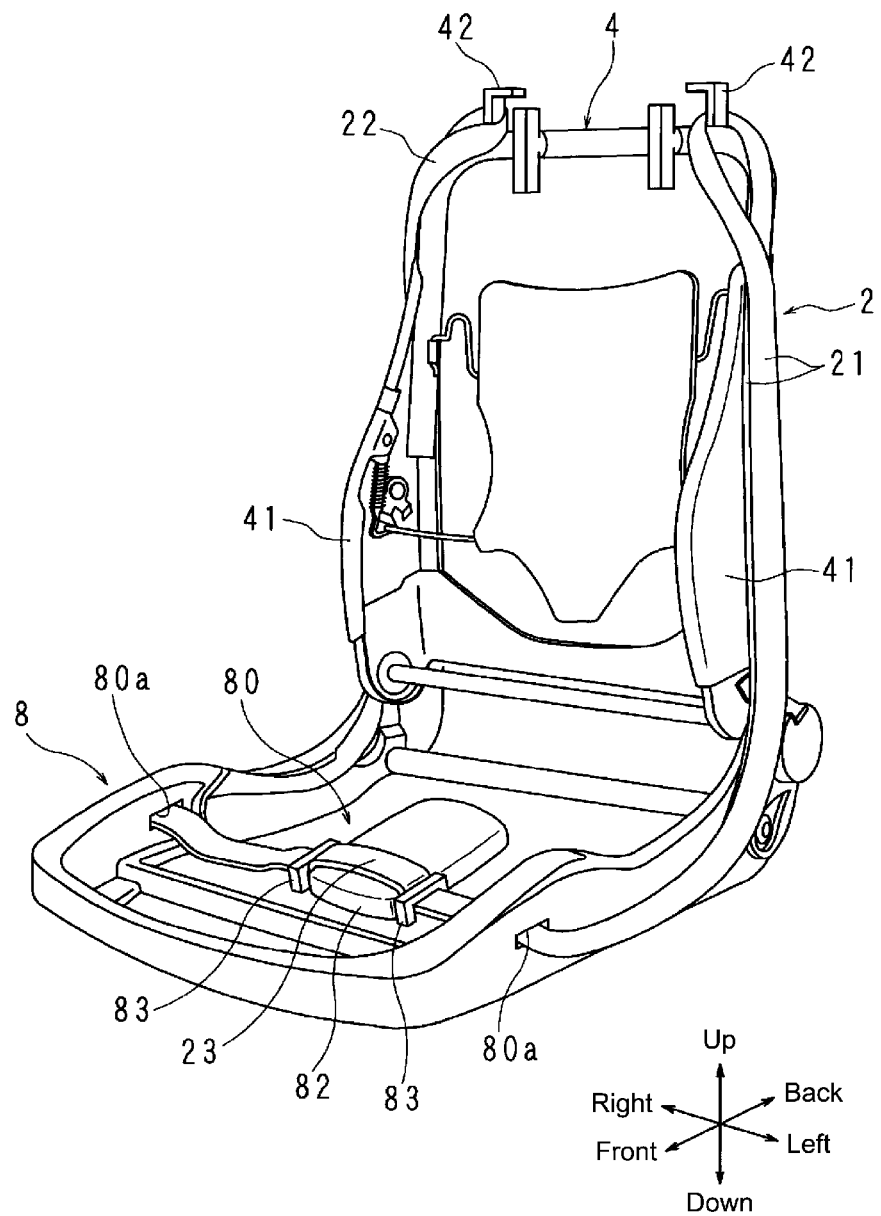
FIG. 3 is a perspective view illustrating the seat to which the occupant restraining device according to Embodiment 1 is attached (side airbags are not shown).

Hereinafter, the present invention will be described with reference to the drawings illustrating the occupant restraining device according to Embodiment 1. In the following description, the top, bottom, front, back, left, and right indicated in the diagram are used. FIG. 1 is an external perspective view of the seat 1. FIG. 2A is a schematic left side partial cross-sectional view of the seat 1 in which an in-seat airbag 82 is folded. FIG. 2B is a schematic left side partial cross-sectional view of the seat 1 with the in-seat airbag 82 deployed. FIG. 3 is a perspective view illustrating the seat 1 to which an occupant restraining device is attached. In FIG. 3, for convenience of description, only the frame of the seat 1 is illustrated; namely, the surface skin of the seat 1, the cushion material of the seatback, and the cushion material of the seating portion are not illustrated. Hereinafter, the cushion material of the seating portion is referred to as a seat cushion 81.

The seat 1 includes a frame body, a cushion material covering the frame body, and a surface skin covering the cushion material. In FIG. 1, the dashed line indicates a frame covered with cushion material. As illustrated in FIG. 1, the frame body of the seat 1 has a first frame body 4 of the seatback and a second frame body 8 of the seating portion. The first frame body 4 is covered by a seatback cushion 40, and the second frame body 8 is covered by the seat cushion 81. The first frame body 4 of the seatback and the second frame body 8 of the seating portion are substantially rectangular. In the following, when an occupant sits in the aforementioned seat normally, the area close to the right shoulder of the occupant is referred to as the right side of the first frame body 4 of the seatback, and the area close to the left shoulder of the occupant is referred to as the left side of the first frame body 4 of the seatback, and the occupant is seated on the front side of the first frame body 4 of the seatback. A headrest 7 is provided on the upper side of the first frame body 4 of the seatback.

An occupant restraining device 100 includes an airbag module (not shown). The airbag module is provided on the outside of long side frames 41 (side portions of the seat back) on both the left and right sides of the first frame body 4, respectively. Note, the airbag module may be provided only on one of the long side frames 41.

The airbag module includes a side airbag 3 (see FIG. 7), described below, and an inflator (not shown) that receives an output signal from a sensor and emits gas. The side airbag 3 is folded. The side airbag 3 includes, for example, the circumference of two base materials sewn together to form a bag shape, and the inflator is arranged inside the side airbag 3. The occupant restraining device 100 protects an occupant by deploying the side airbag 3 in the front direction of the seat during a vehicle collision. A tension band 2 (tension member) described below is sewn onto upper and lower middle points of the side airbag 3 and the side airbag 3 is restrained by the tension band 2.

The occupant restraining device 100 further includes a tension band 2. The tension band 2 is a band having a prescribed width, and two left side bands 21, 21 arranged on the left side of the first frame body 4, two right side bands 22, 22 arranged on the right side of the first frame body 4, and one lower band 23 arranged on the second frame body 8 are provided. The first ends of the two left side bands 21, 21 are connected and attached to an attachment 42 provided on the left upper side of the first frame body 4. The left band 21 is arranged over the outside of the left side long side frame 41 and the outside of the left portion of the second frame body 8. The first ends of the two right side bands 22, 22 are connected and attached to an attachment 42 provided on the right upper side of the first frame body 4. The right band 22 is arranged over the outside of the right side long side frame 41 and the outside of the right portion of the second frame body 8.

The other ends of the two left side bands 21, 21 are connected to a first end of the lower band 23, and the second ends of the two right side bands 22, 22 are connected to a second end of the lower band 23. In FIG. 3, only one right band 22 is illustrated. Note, there may be one left band 21 or there may be three or more. Note, there may be one right band 22 or there may be three or more.

As illustrated in FIG. 3, a stowing recessed portion 80 having a rectangular shape in a plan view is formed on the upper surface of the second frame body 8. As illustrated in FIG. 2A, a seat pan 86 is provided on the front side of the stowing recessed portion 80. Note, in FIG. 3, the description of the seat pan 86 is omitted for ease of understanding. The seat pan 86 is provided with an in-seat airbag 82 and is covered with a seat cushion 81. The in-seat airbag 82 includes an inflator 82a. The in-seat airbag 82 is folded. The in-seat airbag 82 is arranged under the seat cushion 81. The in-seat airbag 82 may be arranged inside the seat cushion 81. The in-seat airbag 82 may be provided on the front side of the stowing recessed portion 80 without providing the seat pan 86.

The inflator 82a is electrically connected to the vehicle-side ECU. For example, the inflator 82a is activated by receiving an impact detection signal in the event of a vehicle frontal collision from the vehicle-side ECU and instantaneously supplies gas to the in-seat airbag 82. The inflator 82a can be one of various types of inflators, such as inflators filled with a gas generating agent, compressed gas, or both, and the like. As illustrated in FIG. 2B, the supply of gas causes the in-seat airbag 82 to expand and deploy, the front portion of the seat cushion 81 to rise, and the knee or thigh portion of an occupant 300 to be lifted. Lifting the knees or thighs restrains the forward movement of the hips of the occupant 300.

Figure 4:
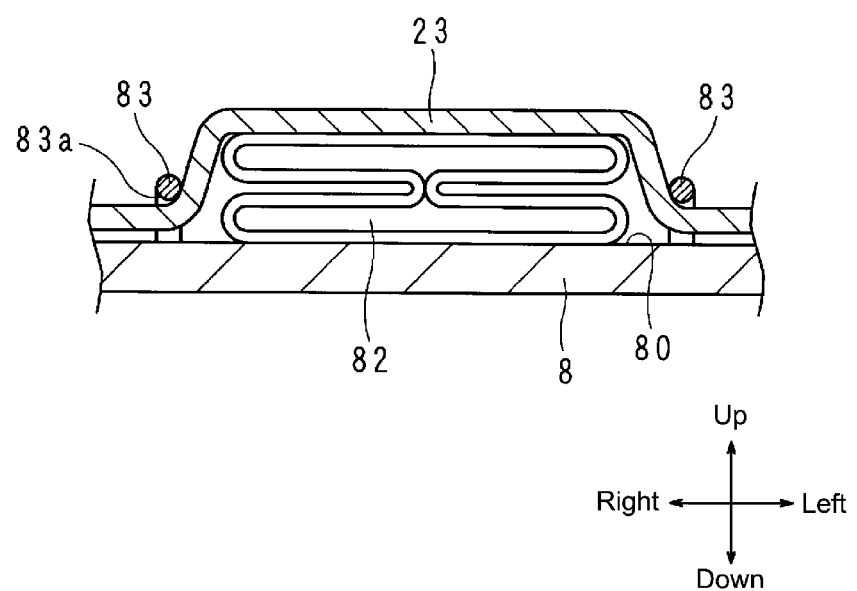
FIG. 4 is a schematic front partial cross-sectional view of an in-seat airbag, a support portion, and a lower band.

FIG. 4 is a schematic front partial cross-sectional view of the in-seat airbag 82, a support portion 83, and the lower band 23. Two support portions 83 are provided on the bottom surface of the stowing recessed portion 80. The two support portions 83 are provided on the right side and the left side of the in-seat airbag 82, respectively. The support portion 83 has a through hole 83a penetrating in the left-right direction.

An in-seat airbag 82 is arranged between the two support portions 83. The lower band 23 is movably inserted into the through hole 83a of each support portion 83, and is connected to the upper surface of the in-seat airbag 82. Methods of connecting the lower band 23 to the upper surface include, for example, joining the lower band 23 and the upper surface by sewing, or attaching a guide that can be inserted into the lower band 23 to the upper surface of the in-seat airbag 82 and connecting the lower band 23 to the upper surface via this guide.

As illustrated in FIG. 3, slits 80a extending back and forth are formed on each of the left and right side surfaces of the second frame body 8. The slit 80a penetrates in the left-right direction and causes the inner space of the stowing recessed portion 80 to communicate with the space outside the second frame body 8. The lower band 23 or the left band 21 is movably inserted into the slit 80a on the left side. The lower band 23 or the right band 22 is movably inserted into the slit 80a on the right side.

Figure 5:
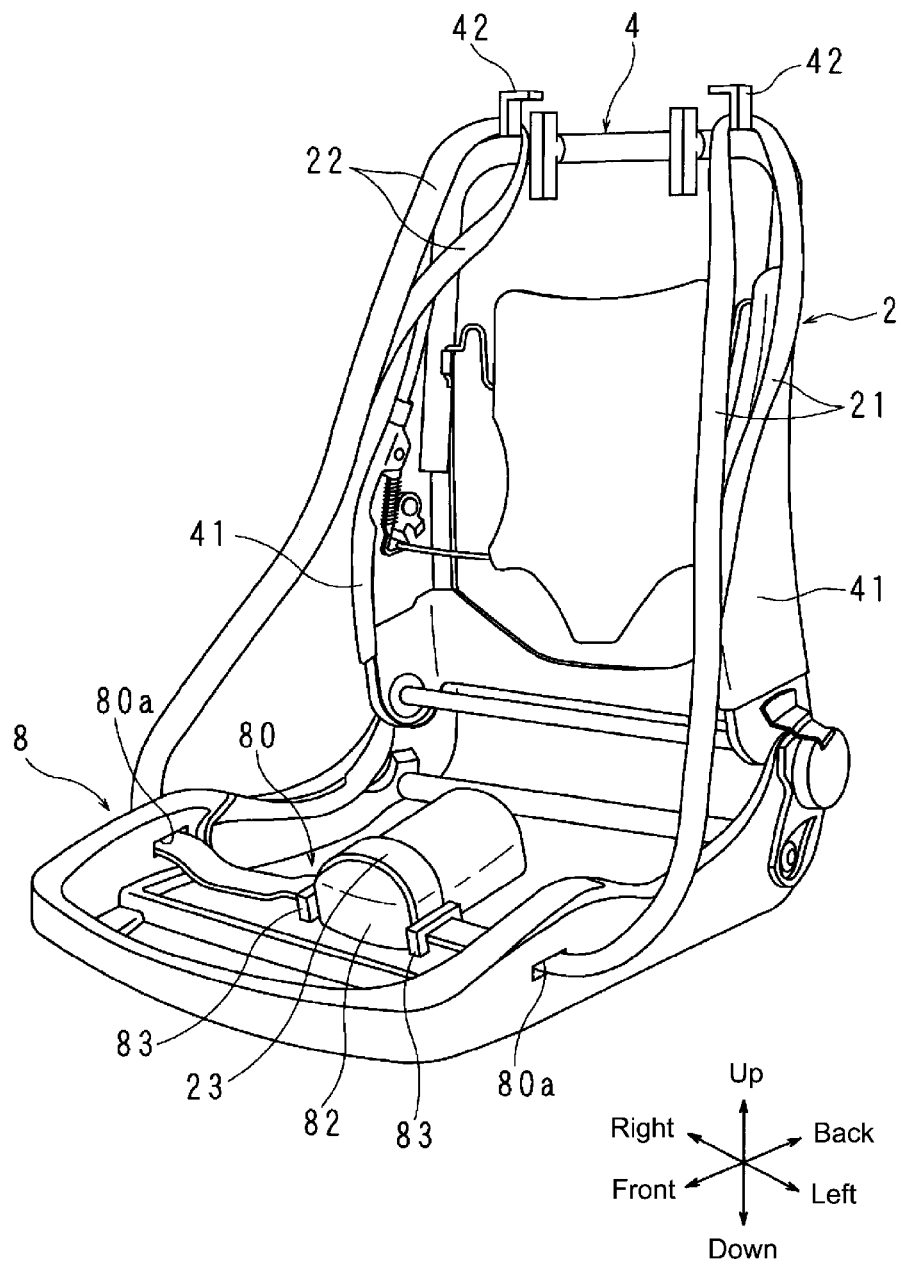
FIG. 5 is a perspective view illustrating an occupant restraining device when the in-seat airbag is expanded and deployed (side airbags are not shown).
Figure 6:
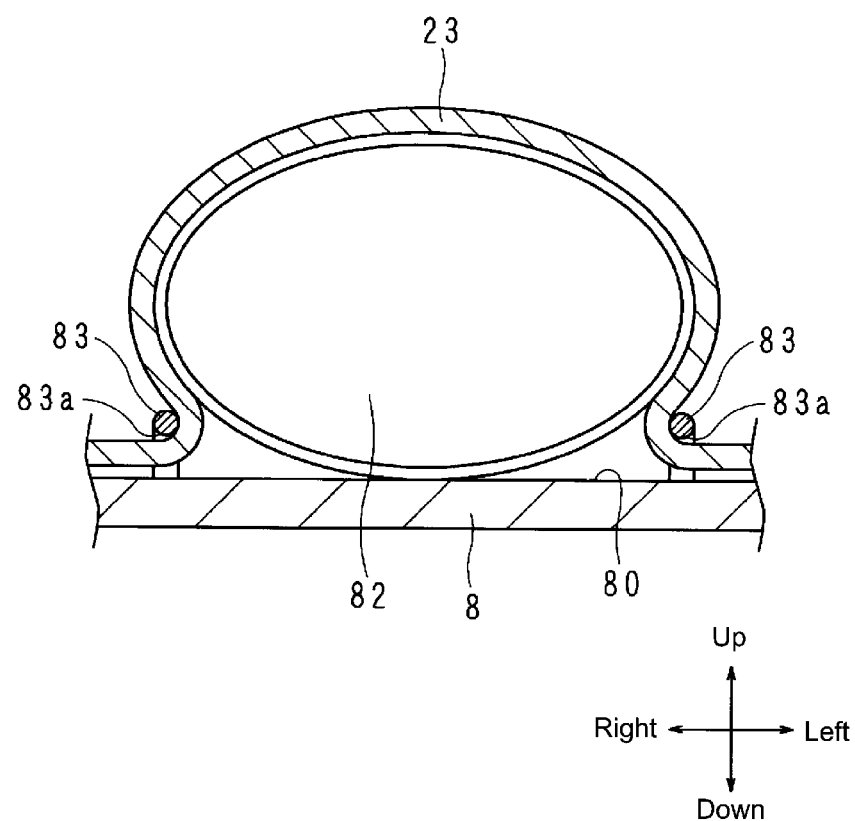
FIG. 6 is a schematic front partial cross-sectional view of the in-seat airbag, the support portion, and the lower band when the in-seat airbag is expanded and deployed.

FIG. 5 is a perspective view illustrating the occupant restraining device 100 with the in-seat airbag 82 expanded and deployed. FIG. 6 is a schematic front partial cross-sectional view of the in-seat airbag 82, the support portion 83, and the lower band 23 when the in-seat airbag 82 is expanded and deployed.

As illustrated in FIG. 5 and FIG. 6, the lower band 23 is pulled up and the left side bands 21, 21 and the right side bands 22, 22 are pulled by the expansion and deployment of the in-seat airbag 82. In other words, tension is applied to the tension band 2.

Figure 7:
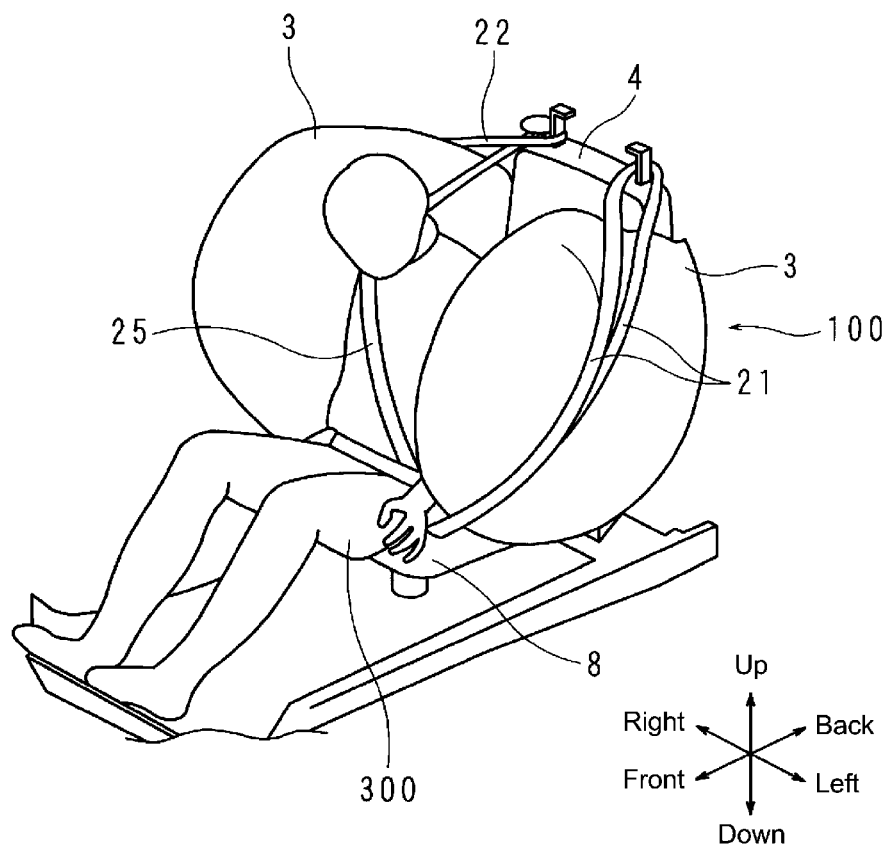
FIG. 7 is a perspective view illustrating the occupant restraining device and the seat when the side airbag and the in-seat airbag are expanded and deployed.

FIG. 7 is a perspective view illustrating the occupant restraining device 100 and the seat 1 when the side airbag 3 and the in-seat airbag 82 are expanded and deployed. In FIG. 7, the headrest 7 is omitted. As described above, the tension band 2 is sewn to the side airbag 3. A first side airbag 3 is arranged between the left side bands 21, 21 and the left side long side frame 41, and a second side airbag 3 is arranged between the right side bands 22, 22 and the right side long side frame 41.

Based on the expansion and deployment of the side airbag 3, the left band 21 is pulled to the left side and the right band 22 is pulled to the right side. As described above, the expansion and deployment of the in-seat airbag 82 lifts the knee or thigh of the occupant 300; suppressing forward movement of the waist of the occupant 300. Further, the expansion and deployment of the in-seat airbag 82 causes the left band 21 and the right band 22 to be pulled toward the center and the front of the seat. In other words, the left band 21 and the right band 22 can push the side airbags 3 toward the occupant and restrain the occupant 300 in combination with suppression of the forward movement of the waist portion. As illustrated in FIG. 7, using a normal three-point seat belt further improves the restraining effect of the occupant 300.

In the occupant restraining device according to Embodiment 1, the tension band 2 is joined to the in-seat airbag 82 stowed inside or below the seat cushion 81, and the tension band 2 is moved by expansion and deployment of the in-seat airbag 82. Therefore, the tension band 2 arranged on the side of the first frame body 4 of the seatback is pulled toward the center and the front of the seat, and in combination with suppressing the forward movement of the waist of the occupant 300, promotes restraining of the occupant by the side airbag 3.

Note, the tension band 2 is not limited to the case where two bands are provided on the left and right. One band may be provided on each of the left and right, or three or more bands may be provided on the left and right. Further, the side airbag 3 may be provided on only one of either the left or right side long side frame 41.

Embodiment 2

Hereinafter, the present invention will be described with reference to the drawings illustrating the occupant restraining device 100 according to Embodiment 2. Of the configurations according to Embodiment 2, the same configurations as those of Embodiment 1 are designated by the same codes, and detailed descriptions thereof are omitted.

Figure 8:
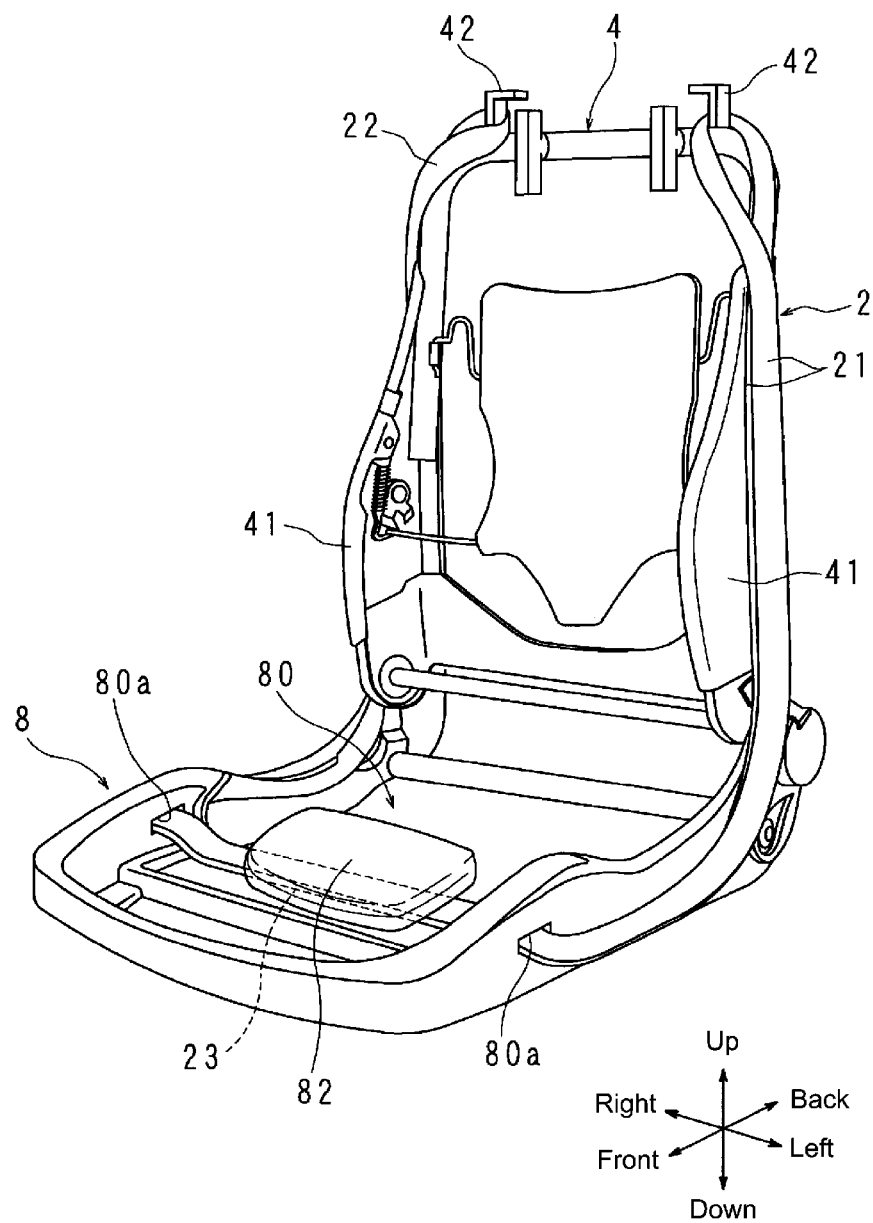
FIG. 8 is a perspective view illustrating the seat to which the folded in-seat airbag according to Embodiment 2 is attached.
Figure 9:
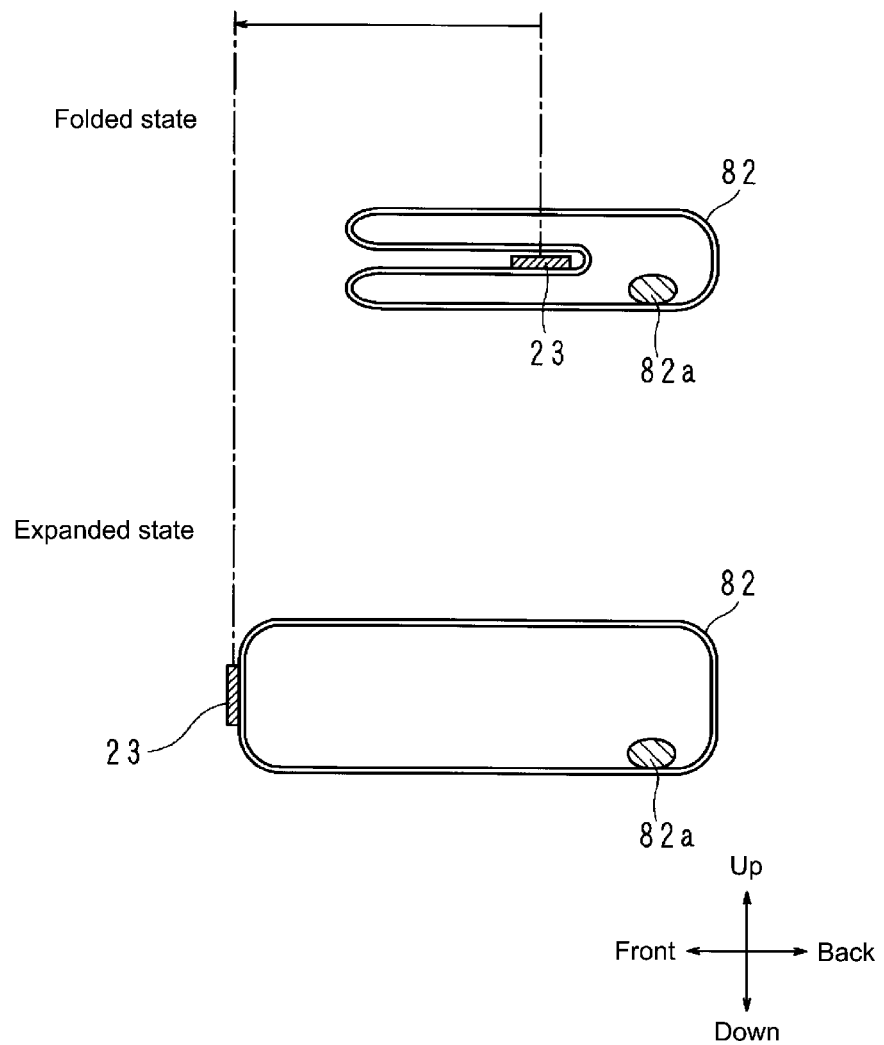
FIG. 9 is a schematic right side view illustrating the in-seat airbag in a folded state and an expanded state.
Figure 10:
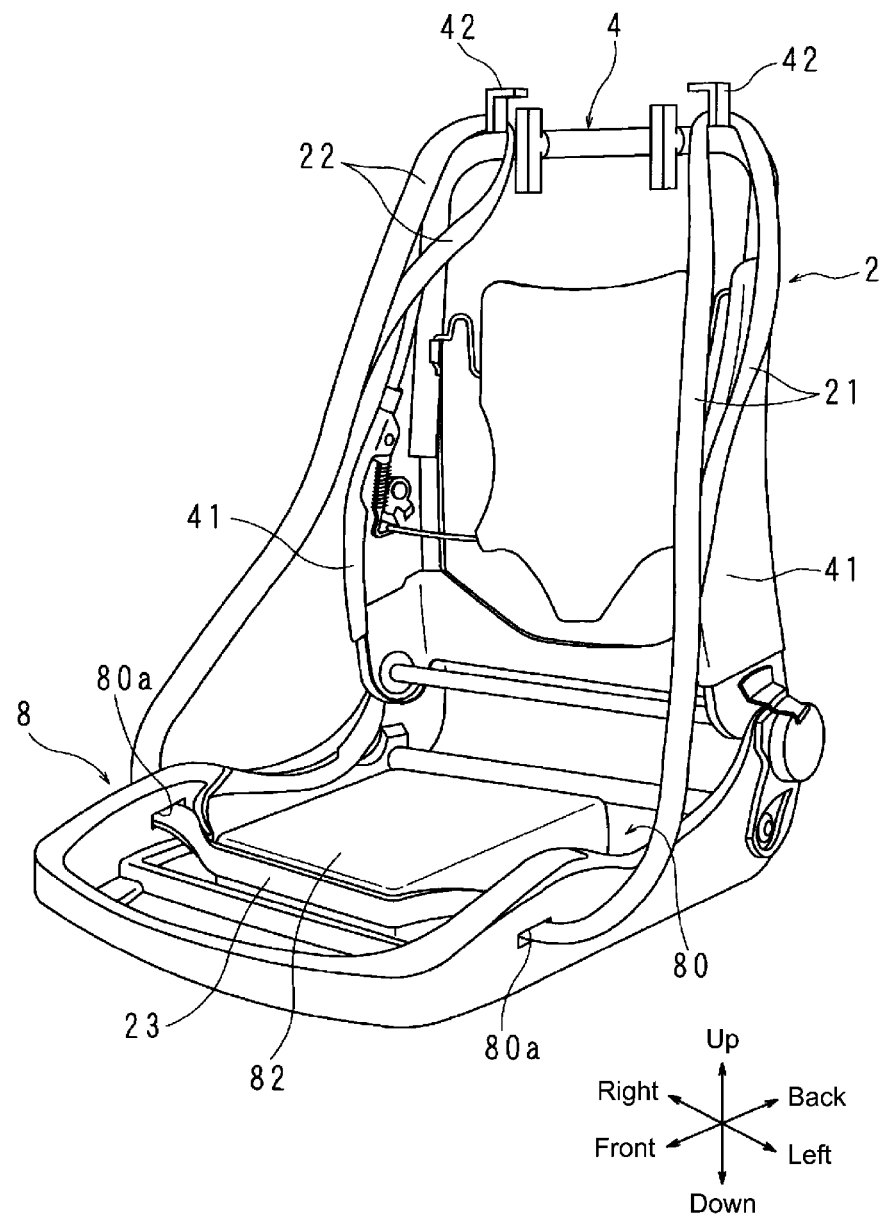
FIG. 10 is a perspective view illustrating the seat with the in-seat airbag that has been expanded and deployed attached (side airbag not shown).

FIG. 8 is a perspective view illustrating the seat to which the folded in-seat airbag 82 is attached. FIG. 9 is a schematic right side view illustrating the in-seat airbag 82 in a folded state and an expanded state. FIG. 10 is a perspective view illustrating the seat to which the expanded and deployed in-seat airbag 82 is attached. The upper view of FIG. 9 illustrates the in-seat airbag 82 in a folded state, and the lower view of FIG. 9 illustrates the in-seat airbag 82 in an expanded state. In addition, the dashed line in FIG. 9 illustrates the position of the lower band 23 of the folded state and the expanded state. In FIGS. 8 and 10, the seat cushion 81 is omitted.

As illustrated in FIG. 8, the folded in-seat airbag 82 is stowed in the stowing recessed portion 80. As illustrated in the upper view of FIG. 9, the front portion of the in-seat airbag 82 is folded so as to be overlapped on the top and bottom. The lower band 23 is connected to the outer surface of the in-seat airbag 82 and is sandwiched between two overlapping in-seat airbags 82. The lower band 23 is connected to the lower portion of the overlapping in-seat airbag 82. In the front-to-back direction, the lower band 23 is attached between the central portion and the rear end portion of the folded in-seat airbag 82.

Note, the lower band 23 may be connected to the lower portion of the overlapping in-seat airbag 82. In the upper view of FIG. 9, the folded in-seat airbag 82 is folded two times, but may be folded three or more times.

As indicated by the arrows in the lower view of FIG. 9, the lower band 23 moves forward when the in-seat airbag 82 expands and deploys. As illustrated in FIG. 10, forward movement of the lower band 23 pulls the left band 21 and the right band 22 toward the center and front of the seat. Therefore, the left band 21 and the right band 22 can push the side airbags 3 toward the occupant and restrain the occupant in combination with suppressing forward movement of the waist of the occupant 300.

Embodiment 3

Hereinafter, the present invention will be described with reference to the drawings illustrating the occupant restraining device 100 according to Embodiment 3. Of the configurations according to Embodiment 3, the same configurations as those of Embodiment 1 or 2 are designated by the same codes, and detailed descriptions thereof are omitted.

Figure 11:
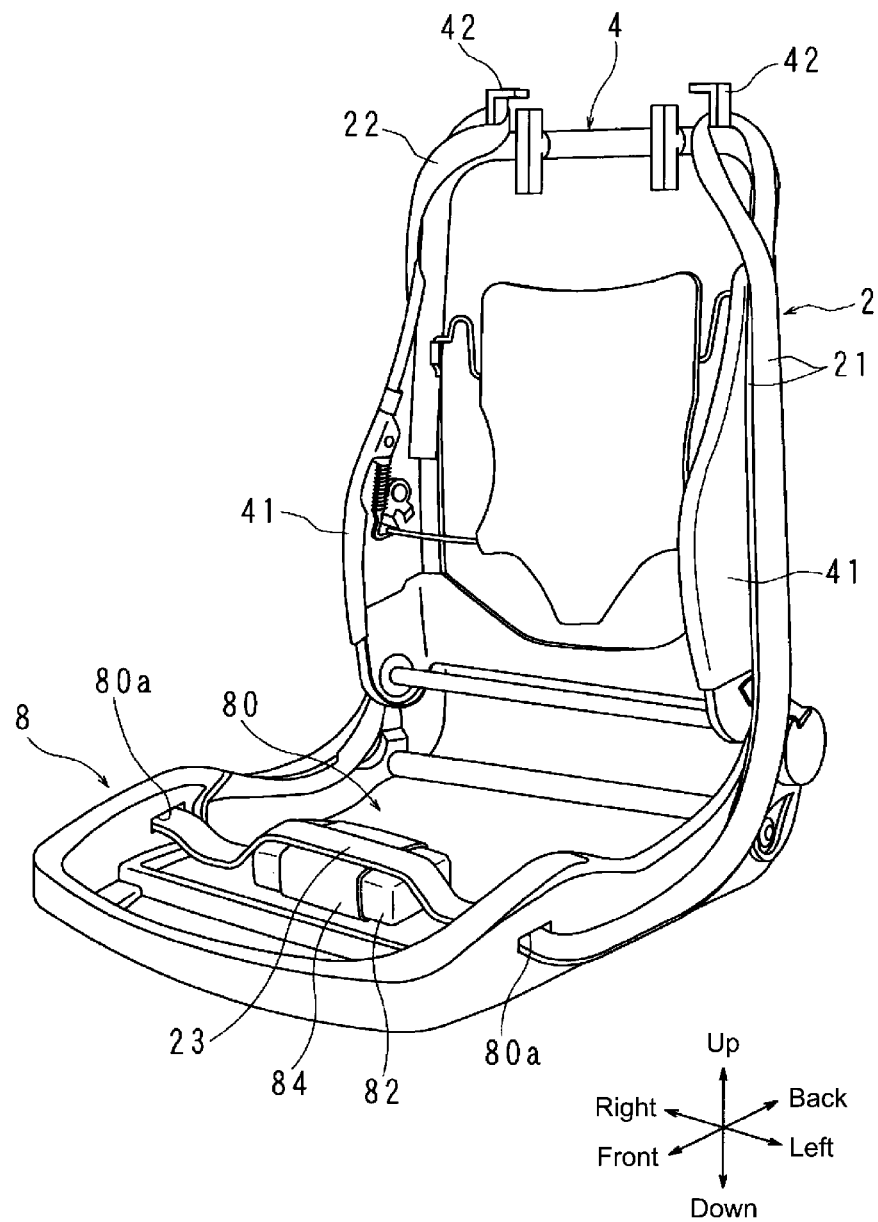
FIG. 11 is a perspective view illustrating the folded in-seat airbag and the seat with a cover attached according to Embodiment 3 (side airbag not shown).
Figure 12:
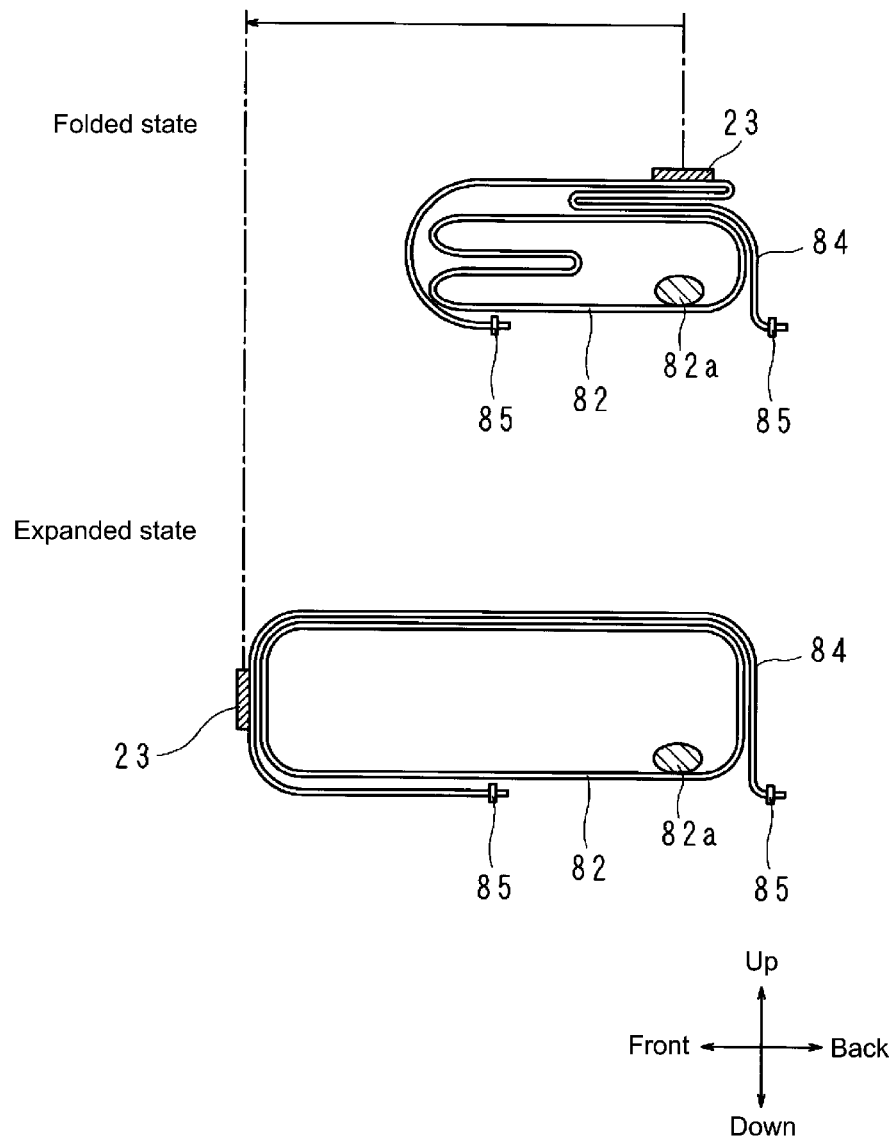
FIG. 12 is a schematic right side view illustrating the in-seat airbag and cover in a folded state and an expanded state.
Figure 13:
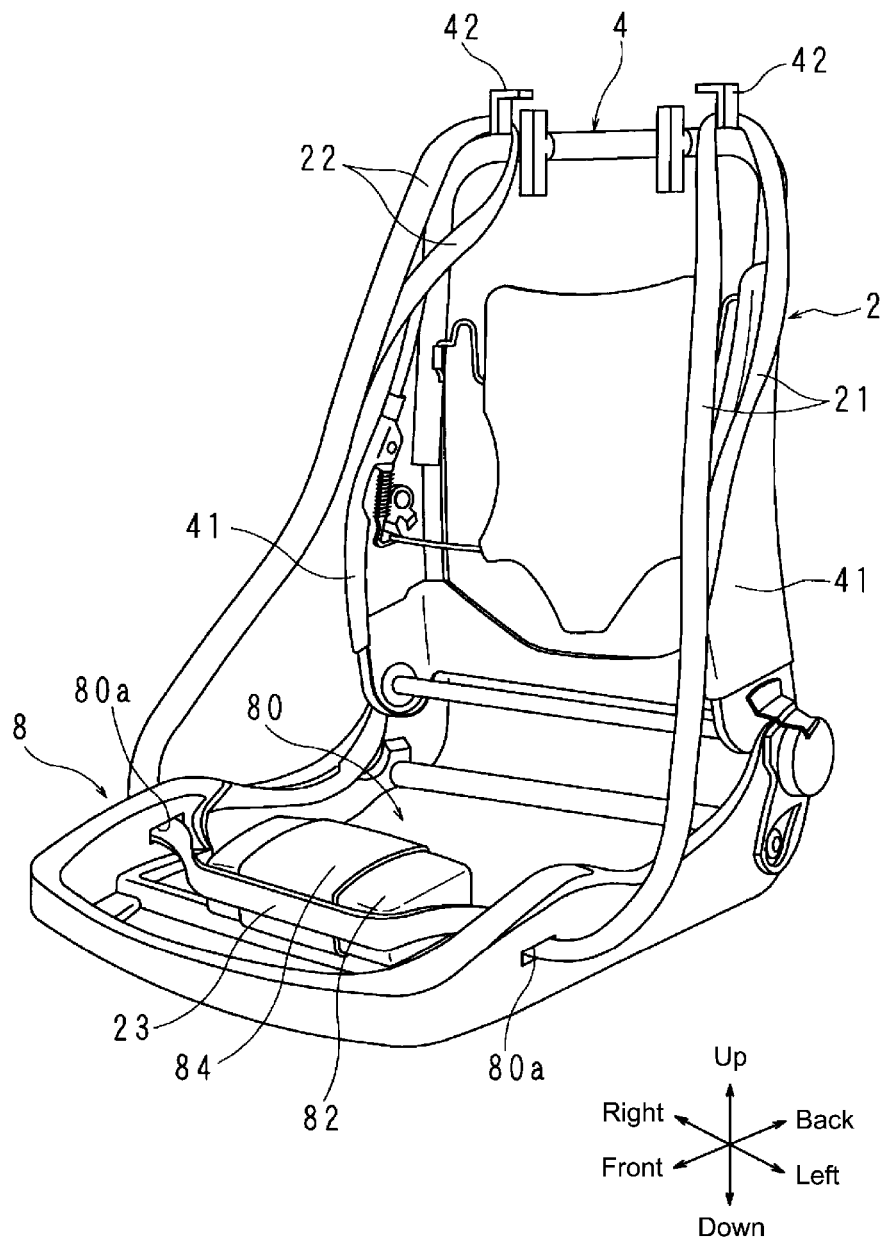
FIG. 13 is a perspective view illustrating the seat with the in-seat airbag and cover that has been expanded and deployed attached (side airbag not shown).

FIG. 11 is a perspective view illustrating the seat to which the folded in-seat airbag 82 and cover 84 are attached. FIG. 12 is a schematic right side view illustrating the in-seat airbag 82 and cover 84 in a folded state and an expanded state. FIG. 13 is a perspective view illustrating the seat to which the expanded and deployed in-seat airbag 82 and cover 84 are attached. The upper view of FIG. 12 illustrates the in-seat airbag 82 in a folded state, and the lower view of FIG. 12 illustrates the in-seat airbag 82 in an expanded state. In addition, the dashed line in FIG. 12 illustrates the position of the lower band 23 of the folded state and the expanded state. In FIG. 11 and FIG. 13, the seat cushion 81 is omitted.

As illustrated in FIG. 11, the folded in-seat airbag 82 (bag) is stowed in the stowing recessed portion 80. The in-seat airbag 82 is covered with a cover 84 (wrapping member). As illustrated in the upper view of FIG. 12, in the vicinity of the front end portion and the rear end portion of the in-seat airbag 82, the front end portion and the rear end portion of the cover 84 are secured to the second frame body 8 by the securing member 85, respectively. The front end portion and the rear end portion of the cover 84 may be secured to the front end portion and the rear end portion of the in-seat airbag 82.

As illustrated in the upper view of FIG. 12, on the upper side of the in-seat airbag 82, the cover 84 is folded back at least once on the upper surface of the in-seat airbag 82. The folded portion of the cover 84 includes, for example, a folded portion folded in a bellows shape. The lower band 23 is connected to the uppermost portion of the folded portion of the cover 84. The lower band 23 is attached to the upper surface of the uppermost portion. The folded portion of the cover 84 may be provided on the lower surface of the in-seat airbag 82, and the lower band 23 may be attached to the folded portion of the cover 84 provided on the lower surface.

In the lower view of FIG. 12, as indicated by the arrows, when the in-seat airbag 82 expands and deploys, the cover 84 and the lower band 23 move forward, and the connecting portion between the lower band 23 and the cover 84 is arranged at the front end portion of the in-seat airbag 82. As illustrated in FIG. 13, forward movement of the lower band 23 pulls the left band 21 and the right band 22 toward the center and front of the seat. Therefore, the left band 21 and the right band 22 can push the side airbags 3 toward the occupant and restrain the occupant in combination with suppressing forward movement of the waist of the occupant 300.

Embodiment 4

Figure 14:
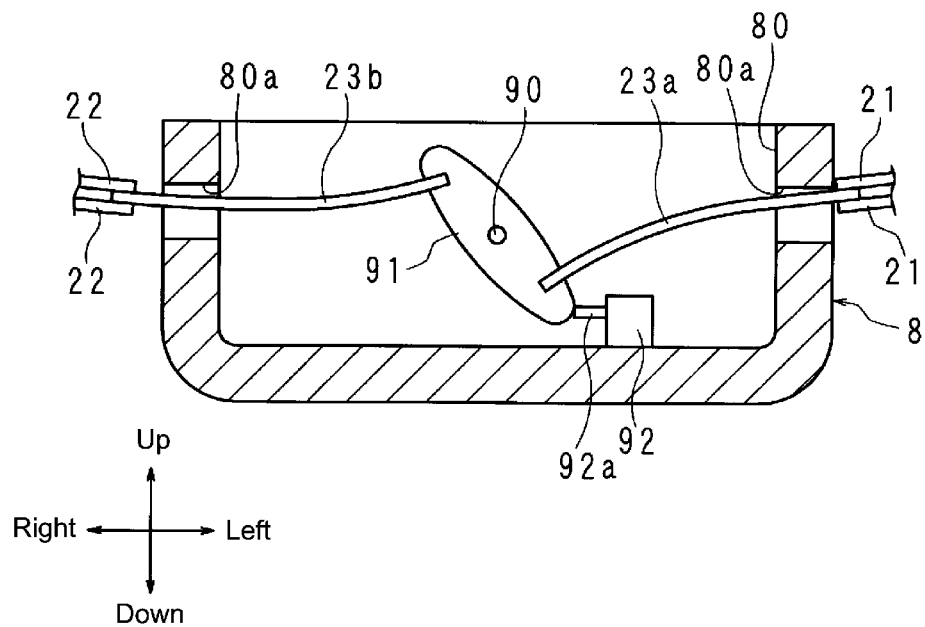
FIG. 14 is a schematic front cross-sectional view of a second frame body according to Embodiment 4.

Hereinafter, the present invention will be described with reference to the drawings illustrating the occupant restraining device 100 according to Embodiment 4. Of the configurations according to Embodiment 4, the same configurations as those of Embodiment 1 to 3 are designated by the same codes, and detailed descriptions thereof are omitted. FIG. 14 is a schematic front cross-sectional view of the second frame body 8.

A rotating body 91 having an elongated shape is stowed in the stowing recessed portion 80. A pivot 90 is provided at the center of the rotating body 91 in the longitudinal direction. The pivot 90 extends in a direction orthogonal to the longitudinal direction of the rotating body 91. The rotating body 91 is arranged so that the axial direction of the pivot 90 is in the front-rear direction. The rotating body 91 can rotate around the pivot 90.

An inflator 92 is stowed in the stowing recessed portion 80. The inflator 92 includes a rod 92a. The rod 92a extends from the body of the inflator 92 and can push the rotating body 91. In FIG. 14, the inflator 92 is arranged on the left side of the rotating body 91 and below the pivot 90, and the rod 92a pushes the lower left portion of the rotating body 91 to the left. The inflator 92 may be arranged on the right side of the rotating body 91 and above the pivot 90, and the rod 92a may push the upper right portion of the rotating body 91 to the left side.

The occupant restraining device 100 includes a first lower band 23a and a second lower band 23b. A first end of the first lower band 23a is connected to the lower left portion of the rotating body 91, and a second end of the first lower band 23a is connected to the lower ends of the two left side bands 21, 21. A first end of a second lower band 23b is connected to the upper right portion of the rotating body 91, and a second end of the second lower band 23b is connected to the lower ends of the two right side bands 22, 22. The first lower band 23a and the left band 21 are arranged so as to enable insertion into the left side slit 80a and the second lower band 23b and right band 22 are arranged so as to enable insertion into the right side slit 80a.

Figure 15:
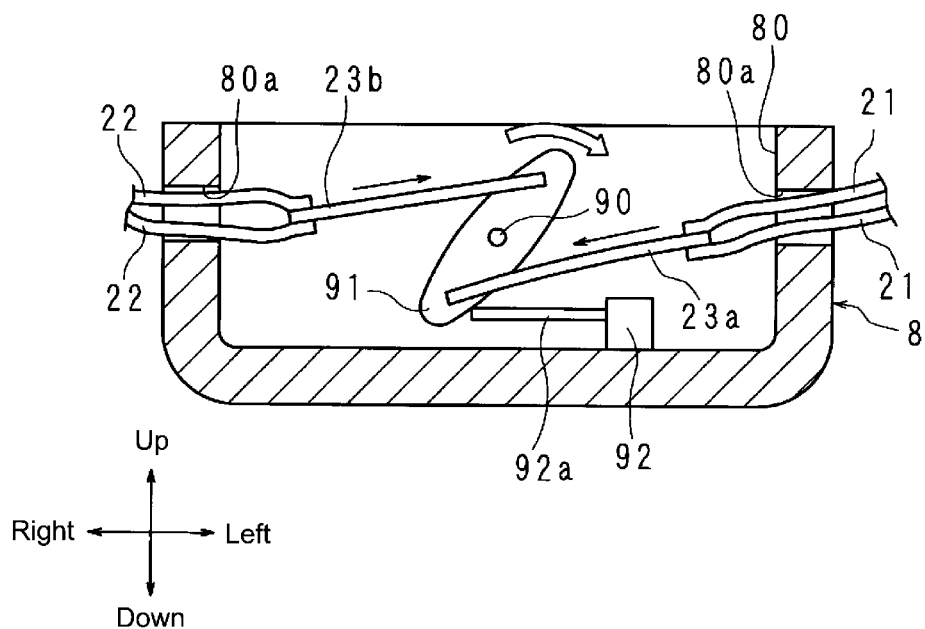
FIG. 15 is a schematic front cross-sectional view of the second frame body where a rod is advanced.

FIG. 15 is a schematic front cross-sectional view of the second frame body 8 where the rod 92a is advanced. The inflator 92 is electrically connected to the vehicle-side ECU. For example, the inflator 92 is activated by receiving an impact detection signal in the event of a vehicle frontal collision from the vehicle-side ECU and, as illustrated in FIG. 15, advances the rod 92a.

As illustrated by the white arrows in FIG. 15, the rotating body 91 rotates, the first lower band 23a and the left band 21 are pulled toward the inside of the stowing recessed portion 80, and the second lower band 23b and the right band 22 are also pulled toward the inside of the stowing recessed portion 80. On the left and right sides of the seat, the left band 21 and the right band 22 are pulled toward the center of the seat. Therefore, the left band 21 and the right band 22 can push the side airbag 3 toward the occupant to restrain the occupant.

The rotating body 91 is highly responsive to the drive of the inflator 92. Therefore, the left band 21 and the right band 22 are pulled immediately after the inflator 92 drive starts. The side airbag 3 can be deployed toward the occupant from the initial stage of expansion and deployment of the side airbag 3. In Embodiment 4, the rotation axis direction of the rotating body 91 is the front-to-back direction but the rotation axis direction is not limited to this and, for example, the rotation axis direction may be the vertical direction.

Figure 16:
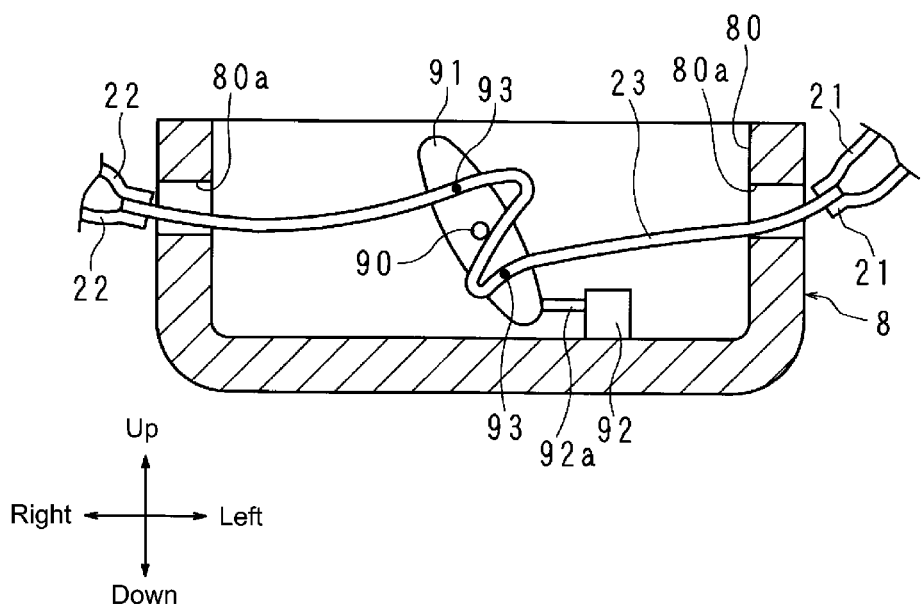
FIG. 16 is a schematic front cross-sectional view of the second frame body using one lower band.

FIG. 16 is a schematic front cross-sectional view of the second frame body 8 using one lower band 23. In Embodiment 4, the first lower band 23a and the second lower band 23b, that is, two lower bands are used, but as illustrated in FIG. 16, one of the lower bands 23 is bent in a Z or S shape and the first end and second end of the portion bent in a Z or S shape may be connected to the rotating body 91 by a connecting member 93 such as a pin. In this case, the first end of the lower band 23 is connected to the left band 21, and the second end is connected to the right band 22.

Embodiment 5

Figure 17:
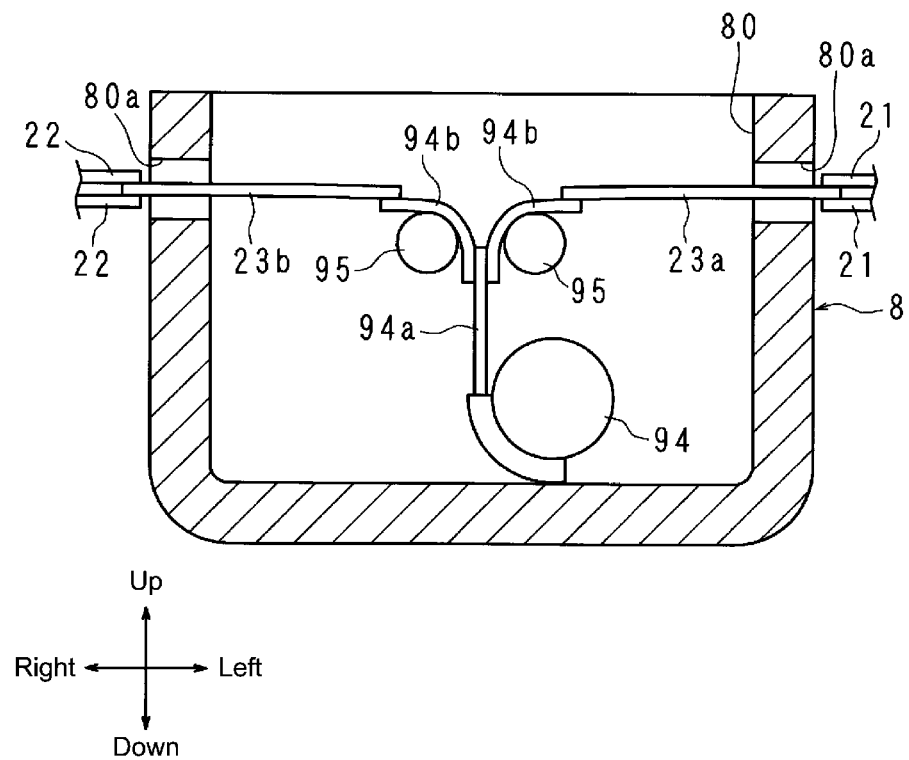
FIG. 17 is a schematic front cross-sectional view of the second frame body according to Embodiment 5.

Hereinafter, the present invention will be described with reference to the drawings illustrating the occupant restraining device 100 according to Embodiment 5. Of the configurations according to Embodiment 5, the same configurations as those of Embodiment 1 to 4 are designated by the same codes, and detailed descriptions thereof are omitted. FIG. 17 is a schematic front cross-sectional view of the second frame body 8.

A retractor 94 and two guide rollers 95, 95 are stowed in the stowing recessed portion 80. The two guide rollers 95, 95 are respectively arranged on the left and the right of the upper side of the retractor 94. The retractor 94 includes a spindle (not shown) that rotates with the front-rear direction as an axial direction for winding the seat belt, and a motor (not shown) that supplies power to the spindle. Further, a first connecting belt 94a and two second connecting belts 94b, 94b are provided. A first end of the first connecting belt 94a is connected to the spindle, and a second end of the first connecting belt 94a extends outward from the main body of the retractor 94.

As illustrated in FIG. 17, in the initial state, the second end of the first connecting belt 94a is positioned between the two guide rollers 95, 95, and is connected respectively to the first ends of the two second connecting belts 94b. The two second connecting belts 94b are arranged on the left and right respectively, and are guided by the two guide rollers 95, 95, respectively.

The second end of the left second connecting belt 94b is connected to the lower ends of the two left side bands 21, 21 via the first lower band 23a. The second end of the right second connecting belt 94b is connected to the lower ends of the two right side bands 22, 22 via the second lower band 23b. The left second connecting belt 94b and the left band 21 are arranged so as to enable insertion into the left side slit 80a and the right second connecting belt 94b and right band 22 are arranged so as to enable insertion into the right side slit 80a.

Figure 18:
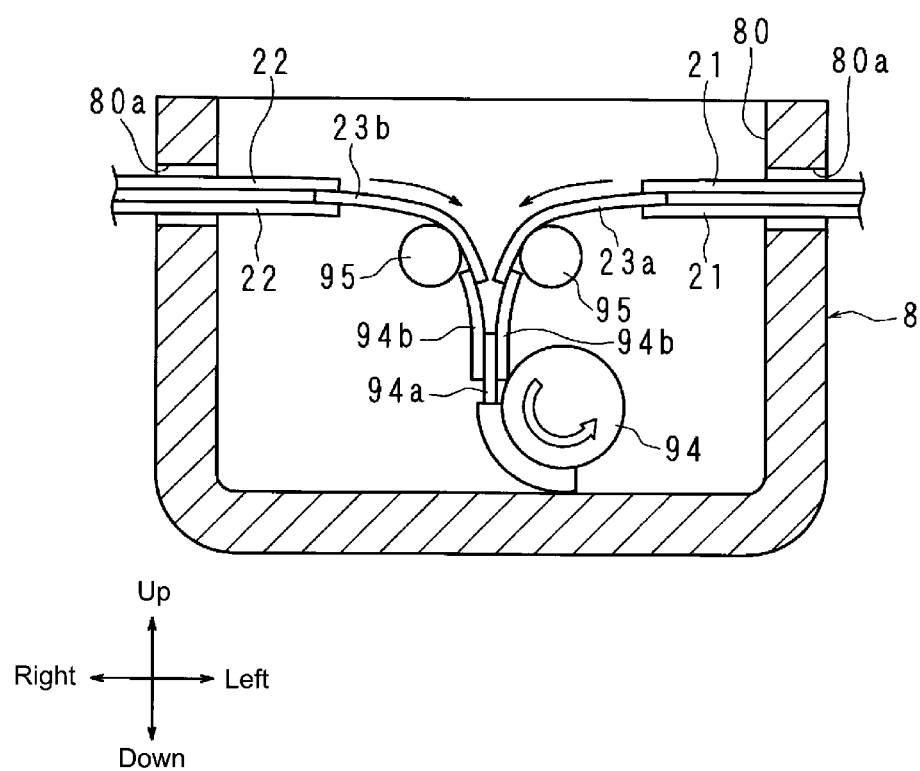
FIG. 18 is a schematic front cross-sectional view of the second frame body where a retractor has been activated.

FIG. 18 is a schematic front cross-sectional view of the second frame body 8 where the retractor 94 has been activated. The retractor 94 is electrically connected to the vehicle-side ECU. For example, the retractor 94 is activated by receiving an impact detection signal in the event of a vehicle frontal collision from the vehicle-side ECU, causes the motor to rotate, and causes the spindle to rotate as illustrated by the white arrow in FIG. 18.

As illustrated by the arrows in FIG. 18, the first connecting belt 94a, the second connecting belt 94b, the first lower band 23a and the second lower band 23b are wound around the retractor 94, and the left band 21 and the right band 22 are pulled toward the inside of the stowing recessed portion 80. On the left and right sides of the seat, the left band 21 and the right band 22 are pulled toward the center of the seat. Therefore, the left band 21 and the right band 22 can push the side airbag 3 toward the occupant to restrain the occupant.

The retractor 94 can wind up the first connecting belt 94a, the second connecting belt 94b, the first lower band 23a, the second lower band 23b, the left band 21, and the right band 22. The winding amount of the retractor 94 is determined according to the specifications of the vehicle.

The retractor 94 is highly responsive to the motor drive. Therefore, the left band 21 and the right band 22 are pulled immediately after the motor drive starts. The side airbag 3 can be deployed toward the occupant from the initial stage of expansion and deployment of the side airbag 3. In Embodiment 5, the rotation axis direction of the retractor 94 spindle is the front-to-back direction but the rotation axis direction is not limited to this and, for example, the rotation axis direction may be the vertical direction.

In Embodiments 4 and 5, the in-seat airbag may be stowed in or below the seat cushion 81.

When a reference code is noted in a claim, the reference code is merely provided as a reference in correspondence with the reference code described in the embodiment in order to facilitate understanding of the claim. The scope of claims is not limited to the embodiments.

The embodiments presently disclosed are to be considered as examples for all points, and are not restrictive. The technical features described in the examples can be combined with each other, and the scope of the invention is intended to include all changes within the scope of the claims and a scope equal to the claims.

EXPLANATION OF CODES

2: Tension band (tension member)
21: Left band
22: Right band
23: Lower band
3: Side airbag
4: First frame body (seatback)
8: Second frame body (frame body)
81: Seat cushion
82: In-seat airbag
83: Support portion
83a: Penetrating hole
84: Cover (wrapping member)
91: Rotating body
94: Retractor
100: Occupant restraining device

The invention claimed is:

1. An occupant restraining device in combination with a vehicle seat having a seat back with an upper frame body and a seat cushion supported by a lower frame body, the occupant restraining device for restraining an occupant seated in the vehicle seat, the occupant restraining device comprising:
a side airbag arranged on a first lateral side of the seat back;
a tension member arranged over a side portion of the seat back and the seat cushion, and a portion of the tension member provided on an outer surface of the side airbag, the tension member continuously extending from an upper portion of the upper frame body of the vehicle seat adjacent the first lateral side of the seat back to the lower frame body of the vehicle seat, across the lower frame body, and to an upper portion of the upper frame body adjacent a second lateral side of the seat back;
a traction portion on which a further portion of the tension member is provided, the traction portion stowed on an inside of or below the seat cushion, the traction portion operative to pull the tension member; and
a further side airbag arranged on the second lateral side of the seat back, wherein the tension member is connected to the seat back adjacent the first and second lateral sides of the seat back at the respective upper portions of the upper frame body, wherein a portion of the tension member arranged on the first lateral side of the seat back is pulled toward a lateral center of the vehicle seat by the traction portion, and wherein the upper frame body includes first and second attachments upwardly extending therefrom adjacent the first and second lateral sides of the seat back, respectively, the tension member wrapped around the first and second attachments.

2. The occupant restraining device according to claim 1, wherein the traction portion has a rotating body, and rotation of the rotating body pulls the tension member toward the lateral center of the vehicle seat.

3. The occupant restraining device according to claim 1, wherein the traction portion has a retractor, and winding of the retractor pulls the tension member toward the lateral center of the vehicle seat.

4. The occupant restraining device according to claim 1, wherein the traction portion includes an in-seat airbag and the tension member is provided on an upper surface of the in-seat airbag.

5. The occupant restraining device according to claim 4, wherein the in-seat airbag is secured to the seat cushion, the tension member inserted through a penetrating hole, and a support portion that movably supports the tension member is provided on an outside of the in-seat airbag.

6. The occupant restraining device according to claim 1, wherein the traction portion includes an in-seat airbag and the tension member is arranged so as to pass in front of the in-seat airbag when the in-seat airbag expands and deploys.

7. The occupant restraining device according to claim 6, wherein the in-seat airbag is folded so as to overlap vertically and a portion of the in-seat airbag that the tension member is arranged on is sandwiched by the in-seat airbag in a vertical direction and is attached in a front-to-back length-wise direction of the in-seat airbag in plan view.

8. The occupant restraining device according to claim 1, wherein the traction portion includes an in-seat airbag and the lower frame body includes an upwardly extending forward portion that upwardly extends from a back to front direction, the in-seat airbag disposed between the seat cushion and the upwardly extending forward portion.

9. The occupant restraining device according to claim 8, wherein an inflator is attached to the upwardly extending forward portion.

10. The occupant restraining device according to claim 1, wherein the traction portion includes an in-seat airbag and further comprising first and second support portions provided on the lower frame body on first and second lateral sides of the in-seat airbag.

11. The occupant restraining device according to claim 10, wherein the first and second support portions are laterally separated by a lateral distance and the in-seat airbag is expandable a maximum lateral width greater than the lateral distance.

12. The occupant restraining device according to claim 1, wherein the traction portion has an in-seat airbag, and expansion and deployment of the in-seat airbag pulls the portion of the tension member arranged on the first lateral side of the seat back toward the lateral center of the vehicle seat.

13. An occupant restraining device in combination with a vehicle seat having a seat back with an upper frame body and a seat cushion supported by a lower frame body, the occupant restraining device for restraining an occupant seated in the vehicle seat, the occupant restraining device comprising:

a side airbag arranged on a first lateral side of the seat back;

a tension member arranged over a side portion of the seat back and the seat cushion, and a portion of the tension member provided on an outer surface of the side airbag, the tension member continuously extending from an upper portion of the upper frame body of the vehicle seat adjacent the first lateral side of the seat back to a first lateral side of the lower frame body of the vehicle seat, across the lower frame body to a second lateral side of the lower frame body of the vehicle seat, and to an upper portion of the upper frame body adjacent a second lateral side of the seat back;

a traction portion on which a further portion of the tension member is provided, the traction portion stowed on an inside of or below the seat cushion, the traction portion operative to pull the tension member; and a further side airbag arranged on the second lateral side of the seat back, wherein the tension member extends from the first lateral side of the lower frame body of the vehicle seat to the second lateral side of the lower frame body of the vehicle seat in a direction parallel to a right-left direction across the vehicle seat.

14. The occupant restraining device of claim 13, wherein the lower frame body includes first and second openings at the first and second lateral sides thereof, respectively, and the tension member passes through the first and second openings.

15. The occupant restraining device of claim 14, wherein the tension member extends from the first opening to the second opening when viewed in an up-down direction.

16. The occupant restraining device of claim 13, wherein the tension member only extends over an upper side of the traction member.

* * * * *